United States Patent
Wang et al.

(10) Patent No.: US 11,983,570 B2
(45) Date of Patent: May 14, 2024

(54) CONDITIONALLY DEPLOYING A REUSABLE GROUP OF CONTAINERS FOR A JOB BASED ON AVAILABLE SYSTEM RESOURCES

(71) Applicant: International Business Machines Corporation, Armonk, NY (US)

(72) Inventors: Yue Wang, Beijing (CN); Xin Peng Liu, Beijing (CN); Zhi Gang Sun, Beijing (CN)

(73) Assignee: International Business Machines Corporation, Armonk, NY (US)

(*) Notice: Subject to any disclaimer, the term of this patent is extended or adjusted under 35 U.S.C. 154(b) by 407 days.

(21) Appl. No.: 17/458,124

(22) Filed: Aug. 26, 2021

(65) Prior Publication Data
US 2023/0075482 A1 Mar. 9, 2023

(51) Int. Cl.
*G06F 9/50* (2006.01)

(52) U.S. Cl.
CPC .......... *G06F 9/5044* (2013.01); *G06F 9/5038* (2013.01); *G06F 9/5083* (2013.01); *G06F 2209/5022* (2013.01); *G06F 2209/508* (2013.01)

(58) Field of Classification Search
None
See application file for complete search history.

(56) References Cited

U.S. PATENT DOCUMENTS

| 9,009,294 B2 | 4/2015 | Dawson et al. |
| 2010/0306356 A1 | 12/2010 | Gao et al. |
| 2018/0276044 A1* | 9/2018 | Fong ............ G06F 9/4881 |
| 2019/0377604 A1* | 12/2019 | Cybulski ........ G06F 9/5072 |

FOREIGN PATENT DOCUMENTS

| CN | 101902352 A | 12/2010 |
| CN | 107341029 A | 11/2017 |
| CN | 108881495 A | 11/2018 |
| CN | 111381936 A | 7/2020 |
| CN | 112434938 A | 3/2021 |
| CN | 112558997 A | 3/2021 |
| EP | 3396543 A1 * | 10/2018 |
| GB | 2564863 A | 1/2019 |

OTHER PUBLICATIONS

International Search Report and Written Opinion from PCT Application No. PCT/CN2022/095475, dated Jul. 23, 2022.
Anonymous, "A method of converting resources on runtime," IP.com Prior Art Database, Technical Disclosure No. PCOM000260079D, Oct. 21, 2019, 3 pages.
Google Cloud, "Running a job," Google Kubernetes Engine, Google Cloud, 10 pages, retrieved on May 28, 2021, from /cloud.google.com/kubernetes-engine/docs/how-to/jobs.
(Continued)

*Primary Examiner* — Eric C Wai
(74) *Attorney, Agent, or Firm* — Zilka-Kotab, P.C.

(57) ABSTRACT

A computer-implemented method according to one embodiment includes identifying a job creation request within a system; determining a current amount of available resources within the system; and conditionally deploying a reusable group of containers for the job, based on the current amount of available resources for the system.

20 Claims, 7 Drawing Sheets

(56) References Cited

OTHER PUBLICATIONS

Red Hat, "Running tasks in pods using jobs," Red Hat, OpenShift, 9 pages, retrieved on Jul. 22, 2021, from /docs.openshift.com/container-platform/4.1/nodes/jobs/nodes-nodes-jobs.html.

Lin et al., "A Threshold-based Dynamic Resource Allocation Scheme for Cloud Computing," Procedia Engineering, vol. 23, 2011, pp. 695-703.

Red Hat, "Automatically adjust pod resource levels with the vertical pod autoscaler," Red Hat, OpenShift, 14 pages, retrieved on May 28, 2021, from /docs.openshift.com/container-platform/4.5/nodes/pods/nodes-pods-vertical-autoscaler.html.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from /csrc.nist.gov/projects/cloud-computing.

Kubernetes, "Jobs," Kubernetes Documentation, Jun. 2021, 11 pages, retrieved from /kubernetes.io/docs/concepts/workloads/controllers/job/.

Knative, "Enterprise-grade Serverless on your own terms," Knative, 2021, 3 pages, retrieved from /knative.dev/docs/ on Jul. 22, 2021.

\* cited by examiner

CONDITIONALLY DEPLOYING A REUSABLE GROUP OF CONTAINERS FOR A JOB BASED ON AVAILABLE SYSTEM RESOURCES

BACKGROUND

The present invention relates to container computing environments, and more particularly, this invention relates to optimizing a deployment of container groups based on system resources.

A popular way to perform processing and/or storage actions is through the use of containers. Groups of these containers may work together to perform jobs within a system. However, when many jobs are being performed within a system, a large amount of containers may be utilized within the system, which may negatively impact an amount of available computing and storage resources within the system.

For example, when a large amount of jobs are created within a system for one or more users within a short time period, a large number of corresponding pods are also created within that short time period. A large amount of system resources may be necessary to accomplish this pod creation, and as a result system resources that are available to other users may be limited. It is therefore desirable to implement a more dynamic pod creation and management environment.

BRIEF SUMMARY

A computer-implemented method according to one embodiment includes identifying a job creation request within a system; determining a current amount of available resources within the system; and conditionally deploying a reusable group of containers for the job, based on the current amount of available resources for the system.

Additionally, in one embodiment, in response to determining that a ratio of an amount of resources needed by the job to the current amount of available resources within the system does not exceed a predetermined threshold amount, a non-reusable group of containers is deployed for the job.

In another embodiment, in response to determining that a ratio of an amount of resources needed by the job to the current amount of available resources within the system does exceeds a predetermined threshold amount, the reusable group of containers is deployed for the job.

In this way, reusable containers may be conditionally implemented based on a current amount of available resources within a system. This may reduce an amount of needed processing and storage when the system is under load (and when the system is utilizing an amount of processing/storage over a threshold), which may in turn improve a performance of the system and avoid an overloading of resources within the system.

According to another embodiment, a computer program product includes one or more computer readable storage media, and program instructions collectively stored on the one or more computer readable storage media, where the program instructions include instructions configured to cause one or more processors to perform a method including identifying, by the one or more processors, a job creation request within a system; determining, by the one or more processors, a current amount of available resources within the system; and conditionally deploying, by the one or more processors, a reusable group of containers for the job, based on the current amount of available resources for the system.

According to another embodiment, a system includes a processor; and logic integrated with the processor, executable by the processor, or integrated with and executable by the processor, where the logic is configured to identify a job creation request within a system; determine a current amount of available resources within the system; and conditionally deploy a reusable group of containers for the job, based on the current amount of available resources for the system.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of conditionally deploying a reusable group of containers for a job based on available system resources.

In one general embodiment, a computer-implemented method according to one embodiment includes identifying a job creation request within a system; determining a current amount of available resources within the system; and conditionally deploying a reusable group of containers for the job, based on the current amount of available resources for the system.

In another general embodiment, in response to determining that a ratio of an amount of resources needed by the job to the current amount of available resources within the system does not exceed a predetermined threshold amount, a non-reusable group of containers is deployed for the job.

In another general embodiment, in response to determining that a ratio of an amount of resources needed by the job to the current amount of available resources within the system does exceeds a predetermined threshold amount, the reusable group of containers is deployed for the job.

In this way, reusable containers may be conditionally implemented based on a current amount of available resources within a system. This may reduce an amount of needed processing and storage when the system is under load (and when the system is utilizing an amount of processing/storage over a threshold), which may in turn improve a performance of the system and avoid an overloading of resources within the system.

In another general embodiment, a computer program product includes one or more computer readable storage media, and program instructions collectively stored on the one or more computer readable storage media, where the program instructions include instructions configured to cause one or more processors to perform a method including identifying, by the one or more processors, a job creation request within a system; determining, by the one or more processors, a current amount of available resources within the system; and conditionally deploying, by the one or more processors, a reusable group of containers for the job, based on the current amount of available resources for the system.

In another general embodiment, a system includes a processor; and logic integrated with the processor, executable by the processor, or integrated with and executable by the processor, where the logic is configured to identify a job creation request within a system; determine a current amount of available resources within the system; and conditionally deploy a reusable group of containers for the job, based on the current amount of available resources for the system.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
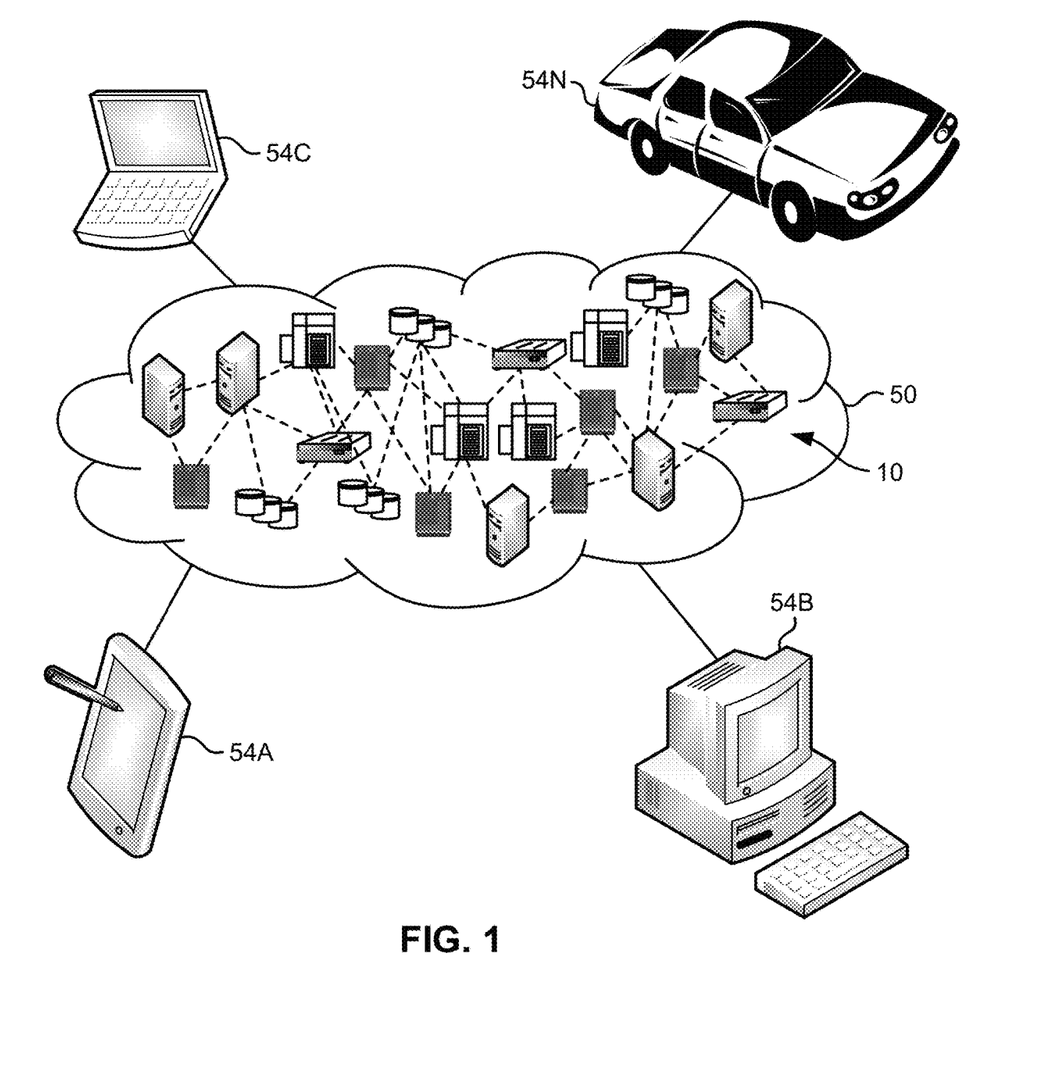
FIG. 1 depicts a cloud computing environment in accordance with one embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
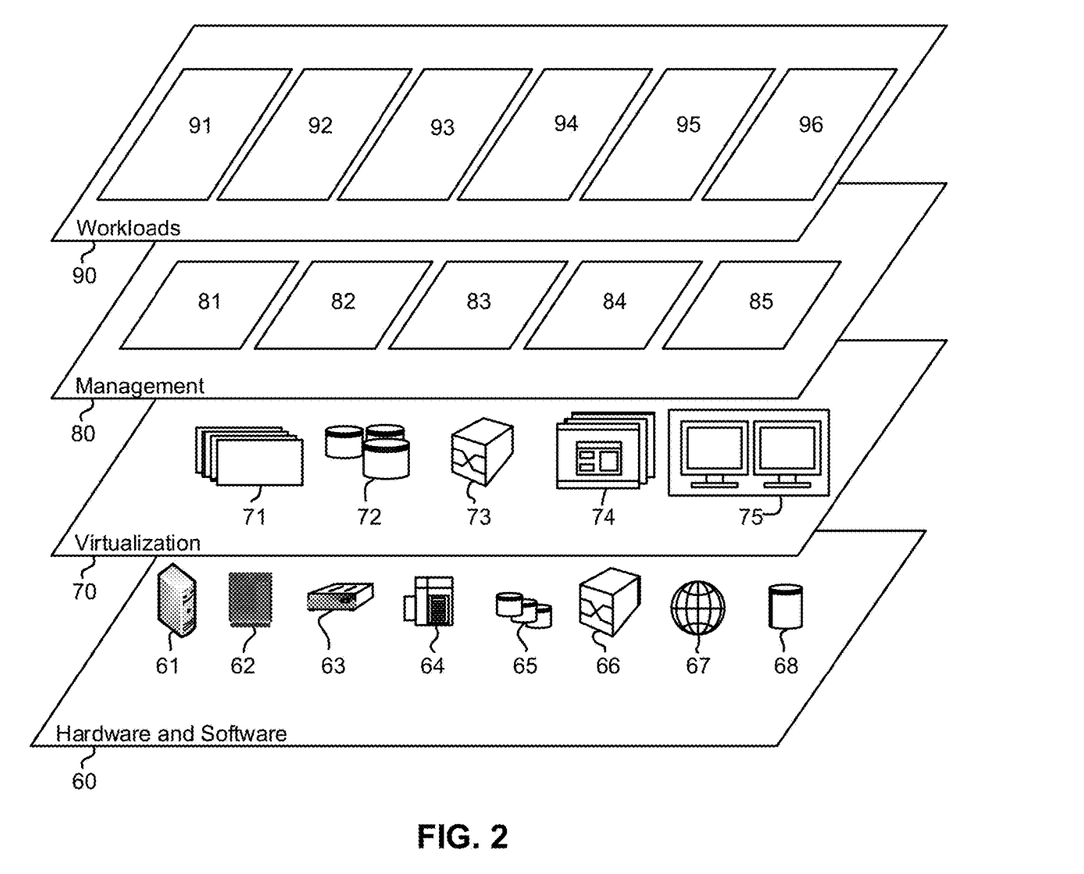
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container deployment 96.

Figure 3:
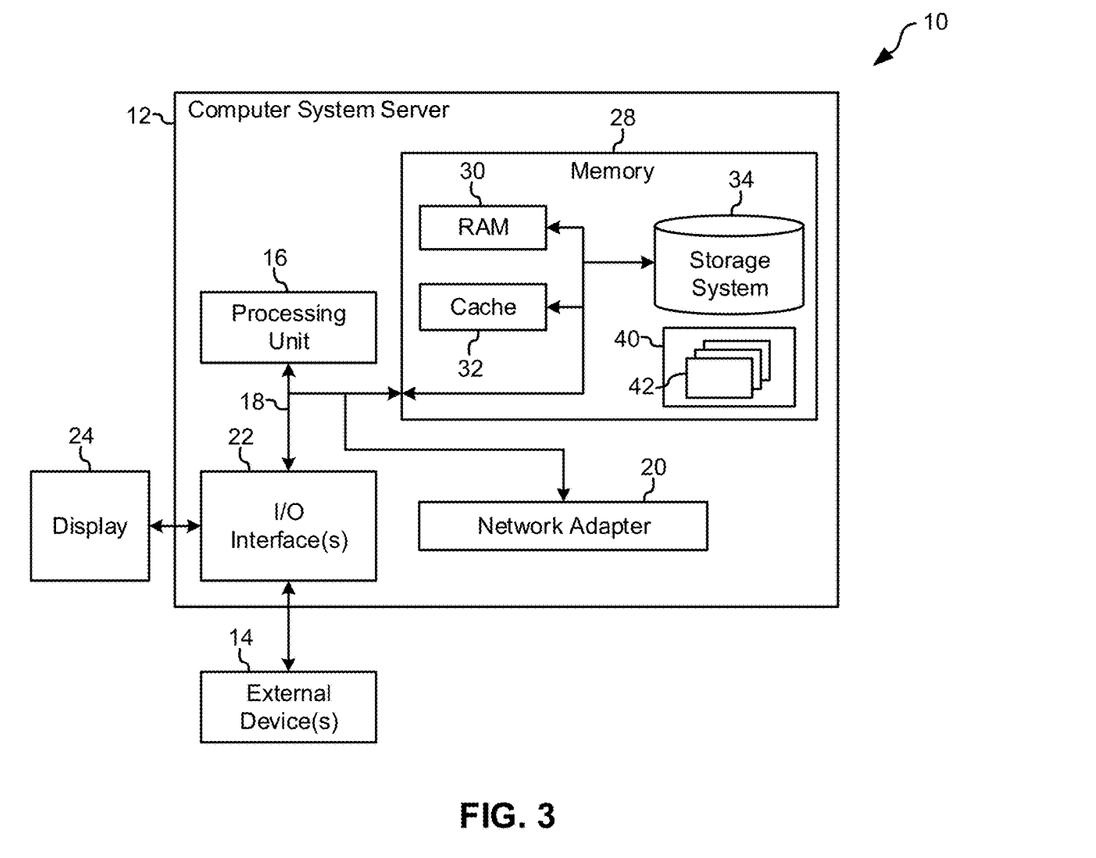
FIG. 3 depicts a cloud computing node in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
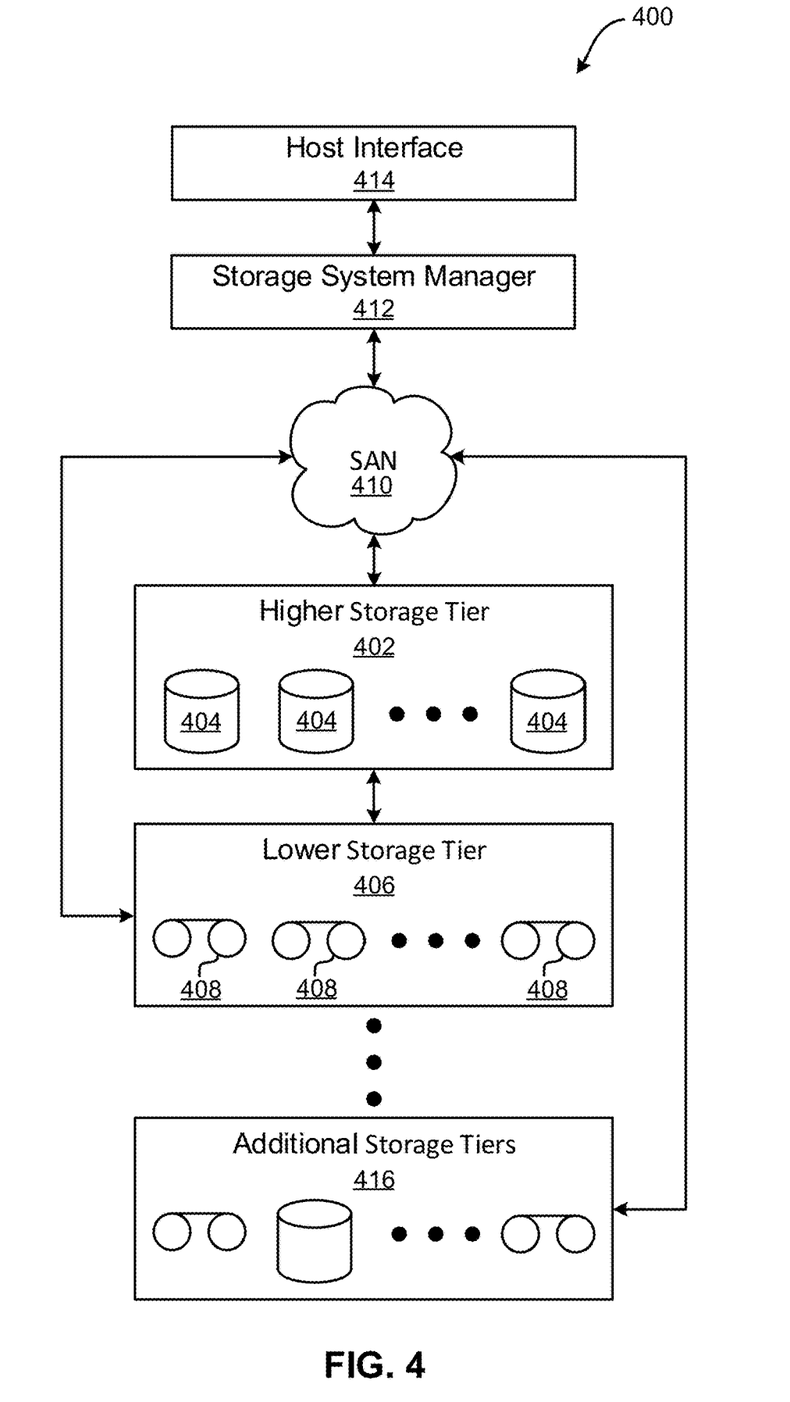
FIG. 4 illustrates a tiered data storage system in accordance with one embodiment of the present invention.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
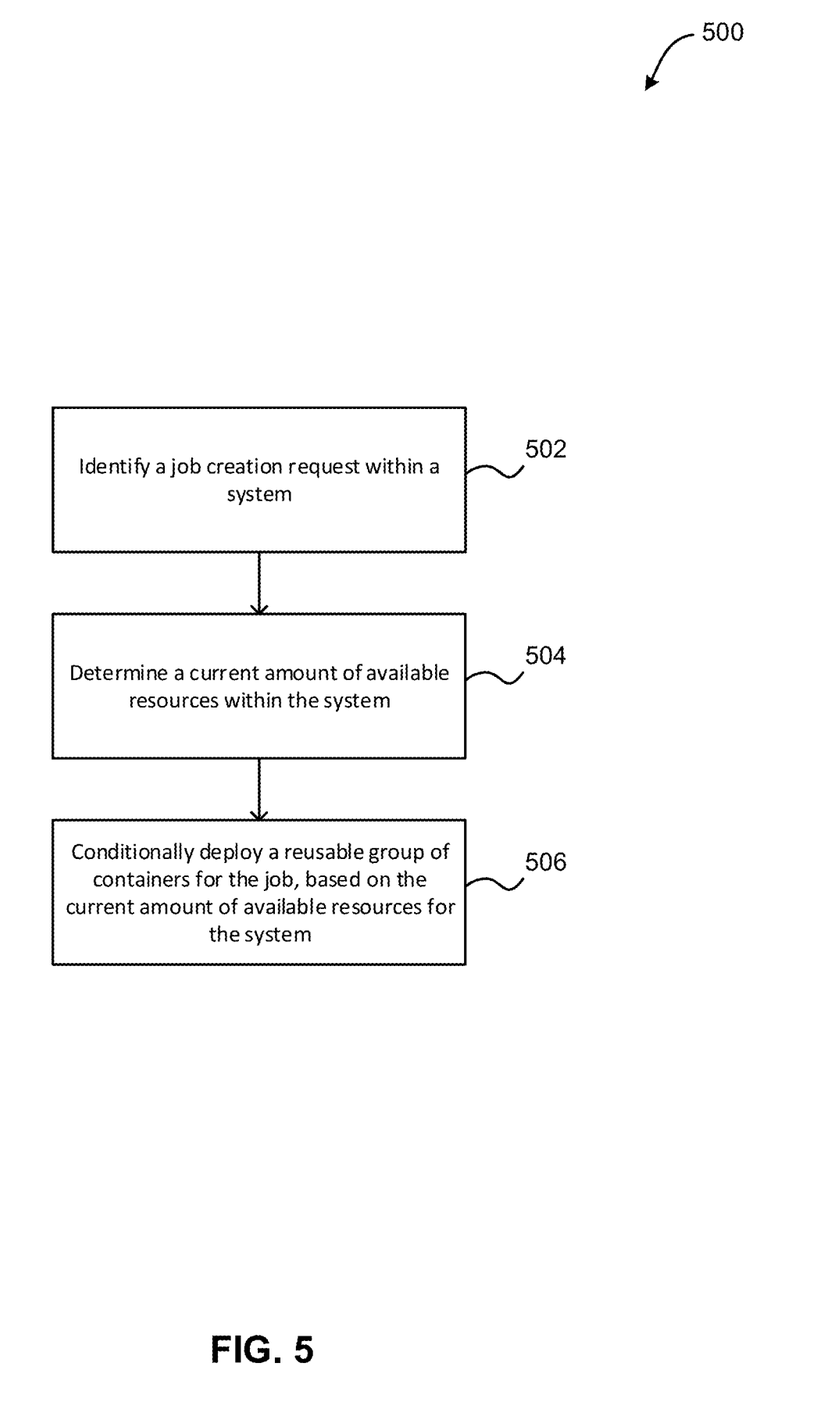
FIG. 5 illustrates a flowchart of a method for conditionally deploying a reusable group of containers for a job based on available system resources, in accordance with one embodiment of the present invention.

Now referring to FIG. 5, a flowchart of a method 500 is shown according to one embodiment. The method 500 may be performed in accordance with the present invention in any of the environments depicted in FIGS. 1-4 and 6-7, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a job creation request is identified within a system. In one embodiment, the job creation request may include a request to create a job within the system, where the job performs one or more operations within the system. In another embodiment, the job creation request may include a request to deploy a group of containers (e.g., a pod) within the system to perform one or more operations within the system.

For example, the job creation request may include a request to implement a job, where the job creates one or more groups of containers and monitors an execution of the one or more groups of containers until a predetermined number of the groups of containers complete their objective and terminate. In another example, each container within a group of containers may include an executable image that contains software (e.g., code) and related dependencies, such as a runtime environment, system tools, system libraries, system settings, etc. In yet another example, each group of containers may share a predetermined amount of storage and network resources.

Additionally, in one embodiment, the job creation request may be identified utilizing an application programming interface (API). In another embodiment, the job creation request may be created/invoked by one or more users, one or more applications, etc. In yet another embodiment, the job creation request may be created/invoked utilizing an API server. In still another embodiment, the system may include a distributed computing system, a cloud-based computing system, a container implementation environment, etc. For example, the system may include a container environment where jobs are created within one or more containers, each of the jobs create pods, and the pods are used to run commands to perform one or more actions (e.g., according to the job).

Further, method 500 may proceed with operation 504, where a current amount of available resources within the system is determined. In one embodiment, the current amount of available resources within the system may be determined in response to identifying the job creation request, or it may be determined periodically (e.g., according to a predetermined schedule, etc.). In another embodiment, the available resources within the system may include hardware and/or software processing resources, storage resources, etc. that are currently available at the time of determination (e.g., at the time the job creation request is received, etc.).

Further still, in one embodiment, the system may be placed in a first mode (e.g., a normal mode, etc.) according to a first predetermined policy (e.g., a normal mode enable policy or a deployment mode disable policy) in response to determining that a current amount of available resources for the system does not exceed a predetermined threshold amount. In another embodiment, the system may be placed in a second mode (e.g., a deployment mode, etc.) according to a second predetermined policy (e.g., a normal mode disable policy or a deployment mode enable policy) in response to determining that a current amount of available resources for the system exceeds a predetermined threshold amount.

Also, method 500 may proceed with operation 506, where a reusable group of containers is conditionally deployed for the job, based on the current amount of available resources for the system. In one embodiment, the reusable group of containers may include a reusable pod. For example, a reusable pod may include a group of containers with shared storage and network resources, as well as a specification indicating how the containers are to be run to implement the job.

In addition, in one embodiment, the current amount of available resources for the system may be compared to a predetermined threshold amount. In another embodiment, an amount of resources needed by the requested job may also be determined. In yet another embodiment, a ratio of the amount of resources needed by the requested job to the current amount of available resources for the system may be compared to a predetermined threshold amount.

Furthermore, in one embodiment, in response to determining that the ratio of the amount of resources needed by the requested job to the current amount of available resources for the system does not exceed the predetermined threshold amount, a non-reusable group of containers may be deployed for the job. For example, in response to determining that the system has been placed in the first mode, a non-reusable group of containers may be deployed to implement the job.

Further still, in one embodiment, a first module (e.g., a scaler module, etc.) may be invoked to deploy the non-reusable group of containers to implement the job. For example, the scaler module may invoke an API to create and deploy the non-reusable group of containers. In another example, the scaler module may create a pod for the job (e.g., a command implementing the requested job), the pod may execute a command when the pod starts, and a result of executing the command may be marked as a job status/summary for the job. In yet another example, the pod may be deleted when the execution of the command has finished.

Also, in one embodiment, in response to determining that the ratio of the amount of resources needed by the requested job to the current amount of available resources for the system exceeds the predetermined threshold amount, a reusable group of containers may be deployed for the job. For example, in response to determining that the system has been placed in the second mode, a reusable group of containers may be deployed to implement the job.

Additionally, in one embodiment, a second module (e.g., a transformer module, etc.) may be invoked to deploy the reusable group of containers to implement the job. For example, the transformer module may invoke an API to create and deploy the non-reusable group of containers. In another example, the scaler module may create a reusable pod for the job that may be reused for other jobs. In yet another example, the reusable pod may execute a command when the pod starts (e.g., a command implementing the requested job), and a result of executing the command may be marked as a job status/summary for the job. In still another example, the pod may be maintained (e.g., may not be deleted) when the execution of the command has finished.

Further, in one embodiment, the reusable group of containers may be deployed for an additional job. For example, a second job creation request (separate from the initial job creation request) may be identified within the system. In another example, it may be determined whether the reusable pod invoked by the second module can implement the second job. In yet another example, in response to determining that the reusable pod invoked by the second module cannot implement the second job, an API server may be invoked to create another pod to implement the second job.

Further still, in one example, in response to determining that the reusable pod invoked by the second module can implement the second job, pod information may be retrieved for the reusable pod, and the second module may invoke an API to execute a command within the reusable pod (e.g., a command implementing the second job), based on the pod information for the reusable pod. In another example, a result of executing the command may be marked as a job status/summary for the second job.

In this way, reusable containers may be conditionally implemented based on a current amount of available resources within a system. For example, reusable containers may be implemented when available system resources are below a threshold, which may reduce an amount of resources necessary to create future containers. This may reduce an amount of needed processing and storage when the system is under load (and when the system is utilizing an amount of processing/storage over a threshold), which may in turn improve a performance of the system and avoid an overloading of resources within the system.

Figure 6:
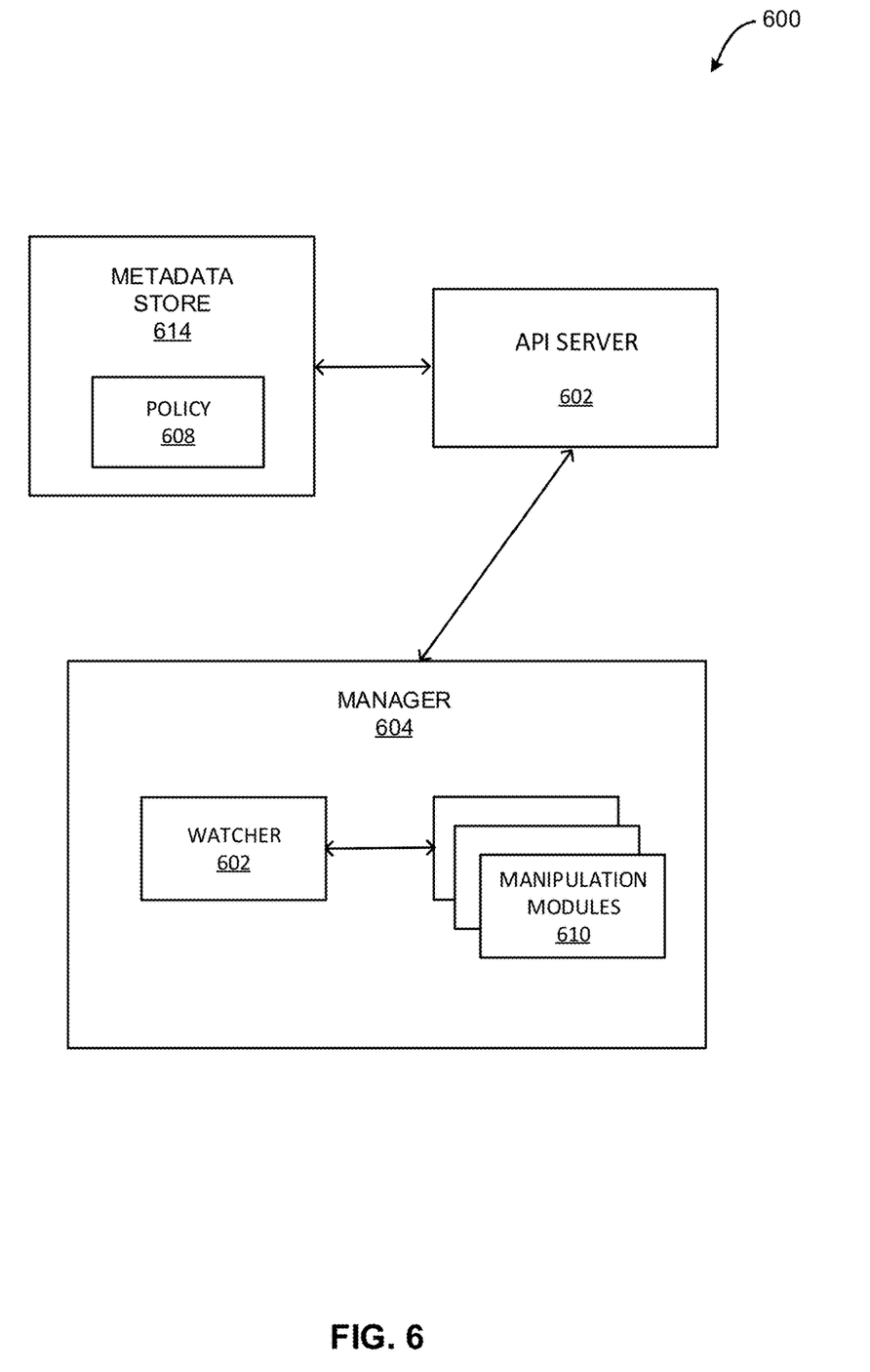
FIG. 6 illustrates an exemplary load sensitive polymorphic job deployment environment, in accordance with one embodiment of the present invention.

FIG. 6 illustrates an exemplary load sensitive polymorphic job deployment environment 600, according to one exemplary embodiment. As shown, a watcher module 602 within a manager 604 identifies a job creation request received via an API server 606. In response, the watcher module 602 determines whether a normal mode or a deployment mode is currently enabled for a system. The enablement of these modes is performed by comparing a current amount of available system resources to a predetermined threshold according to a predetermined policy 608 stored in a metadata store 614.

For example, the system may be placed in a normal mode in response to determining that a current amount of available resources for the system does not exceed a predetermined threshold amount. In another example, the system may be placed in a deployment mode in response to determining that a current amount of available resources for the system exceeds a predetermined threshold amount.

Additionally, in one embodiment, in response to determining that a normal mode is currently enabled for a system, the watcher module 602 may invoke one or more manipulation modules 610 to deploy a non-reusable group of containers to implement the requested job. For example, the one or more manipulation modules 610 may invoke an API to create and deploy the non-reusable group of containers.

Further, in one embodiment, in response to determining that a deployment mode is currently enabled for the system, the watcher module 602 may invoke one or more manipulation modules 610 to deploy a reusable group of containers to implement the requested job. For example, the one or more manipulation modules 610 may invoke an API to create and deploy the reusable group of containers.

Further still, in one embodiment, a second job creation request separate from the initial job creation request may be identified via the API server 606 by the watcher module 602. In another embodiment, it may be determined that the reusable group of containers invoked by the one or more manipulation modules 610 can implement the second job, and the one or more manipulation modules 610 may invoke an API to execute a command implementing the second job within the reusable pod, based on retrieved pod information for the reusable pod.

In this way, the watcher module 602 may enable container reuse by invoking the one or more manipulation modules 610 to deploy and reuse a reusable group of containers to implement requested jobs in response to determining that a deployment mode is currently enabled for a system. This may reduce an amount of needed system resources when available system resources fall below a predetermined threshold, which may improve a performance of one or more hardware devices within the system.

Implementing Load-Sensitive Polymorphic Job Deployment within a Container Management Platform Within a container computing environment, a job creates one or more pods and ensures that a specified number of them successfully terminate. As pods successfully complete, the job tracks the successful completions. When a specified number of successful completions is reached, the task (e.g., job) is complete. Deleting a job will clean up the pods it created. In one embodiment, one job object may be created in order to reliably run one pod to completion. The job object will start a new pod if the first pod fails or is deleted (e.g., due to a node hardware failure or a node reboot). A job may also be used to run multiple pods in parallel.

However, if many jobs are created in short time, many pods will also be created in short time, which may occupy too many resources of a container computing cluster (e.g., a Kubernetes cluster), which may prevent new resources from being allocated to a user. For example, Kubernetes deployment may be designed as long-run process, while a job is created for a short time task. However, low resource utilization under a low volume of workloads with a resource type of deployment may produce resource waste.

In one embodiment, a workload may be initially designed with one resource type while in response to a traffic change other resource types may prove to be more cost effective. For example, order confirmation email logic may be implemented as a job which may trigger by order submission. During specific time periods like month end, quarter end etc., due to a dramatic increase in order volume, the job may consume more resources that if it was implemented via a deployment module.

In response, job management behavior may dynamically change to deploy and invoke resources based on current system performance and may dynamically adapt to an original job or a deployment implementation.

In one embodiment, during a development time, a job transformation policy may be defined. During runtime, a user or service may invoke one or more jobs. A watcher may identify a job creation request from an API server. If a job is in a normal mode, if a deployment mode enable policy is not triggered, the watcher may invoke a scaler to invoke an API to create a pod for the job. If a deployment mode enable policy is triggered, the watcher may change the job mode to a deployment mode and may invoke a transformer to invoke an API to run a command (cmd).

Additionally, if a job is in a deployment mode, if a deployment mode disable policy is not triggered, the watcher may invoke a transformer to invoke an API to run a command. If a deployment mode disable policy is triggered, the watcher may change the job mode to a normal mode and may invoke a scaler to invoke an API to create a pod for the job.

A transformation policy may be used to define when to transform a job from a normal mode to a deployment mode, and when to transform a job from a deployment mode to a normal mode. Table 1 illustrates an exemplary transformation policy, according to one exemplary embodiment.

TABLE 1

1. Deployment mode enable Policy
If (resource needed by job creation)/(resource left in cluster) > 0.5 in 60s, transform Job from Normal mode to Deployment mode
2. Deployment mode disable Policy
If (resource needed by job creation) / (resource left in cluster) <0.1 in 60s, transform Job from Deployment mode to Normal mode In another embodiment, a user or service may invoke a job by invoking a command. Table 2 illustrates and exemplary command (cmd), according to one exemplary embodiment.

Figure 7:
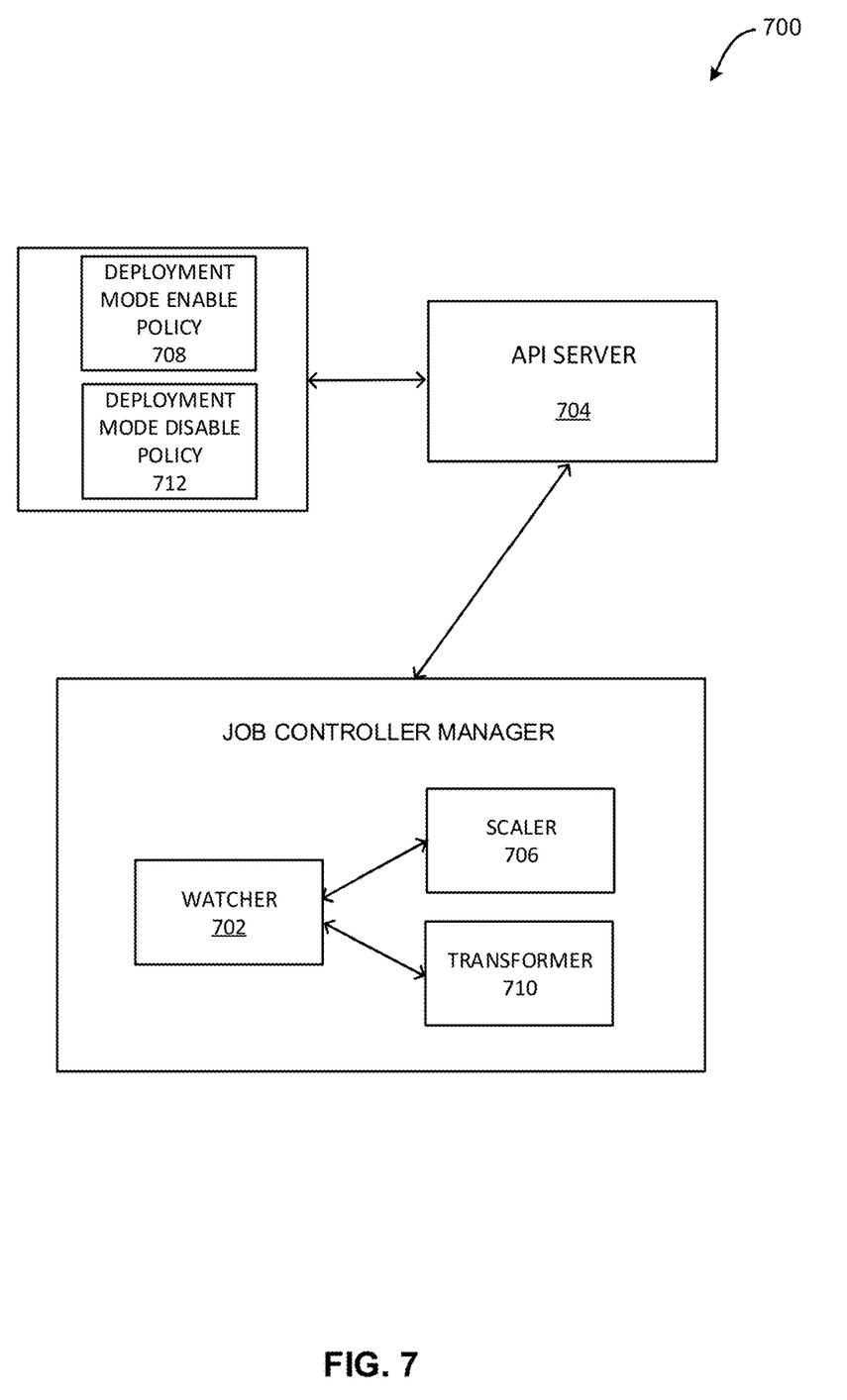
FIG. 7 illustrates an exemplary container architecture, in accordance with one embodiment of the present invention.

TABLE 2 kubectl apply -f https://kubernetes.io/examples/controllers/job.yaml
apiVersion: batch/v1
kind:Job
metadata:
  name: pi
spec:
  template:
    spec:
      containers:
    - name: pi
      image: python
      command: ["python", "calculate.py"]
    restartPolicy: Never
backoffLimit: 4
enableTransformPolicy: true FIG. 7 illustrates an exemplary container architecture 700, according to one exemplary embodiment. As shown, a watcher 702 identifies a job creation request from an API server 704. If the watcher 702 determines that a job is currently in a normal mode, and if a deployment mode enable policy 708 is not triggered, the watcher 702 invokes a scaler 706 to invoke an API to create a pod for the requested job. For example, the following steps may be performed utilizing the scaler 706:

1) A pod is created for a job
2) The pod executes cmd when the pod starts
3) The cmd result is marked as a job status
4) The pod is deleted when cmd is finished If the deployment mode enable policy 708 is triggered, the watcher 702 changes the job mode to a deployment mode and invokes a transformer 710 to invoke an API to run cmd. For example, the following steps may be performed utilizing the scaler 706:

1) A Pod is created for a job and can be reused for other jobs
2) API server invokes cmd in a pod
3) The cmd result is marked as Job status
4) The Pod is not deleted when cmd is finished Additionally, if the watcher 702 determines that the job is in a deployment mode, and if a deployment mode disable policy 712 is not triggered, the watcher 702 invokes the transformer 710 to invoke an API to run cmd. If the deployment mode disable policy 712 is triggered, the watcher 702 changes the job mode to a normal mode and invokes the scaler 706 to invoke and API to create a pod for the job.

In this way, a cost of performing jobs within a cloud-based environment may be reduced, and an efficiency of the services being provided by the environment may be made more efficient. In another embodiment, a spot instances feature within the cloud may be used. Even with unstable resources within a cloud environment, applications running on thousands of nodes may can obtain their desired data in the shortest possible time. The server array size may be increased or decreased based on the resource usage with no resource waste.

Additionally, changes to existing container implementation infrastructures may be minimized while achieving dynamic load-sensitive resource utilization. These changes may be transparent to container implementation application developers, and may benefit from internal resource monitoring and scheduling to implement jobs. A uniform interface may also be provided for job self-lifecycle management regardless of a current transition mode.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying a job creation request within a system;
   determining a current amount of available resources within the system;
   conditionally deploying a reusable group of containers for the job, based on the current amount of available resources for the system,
   wherein in response to determining that a ratio of an amount of resources needed by the job to the current amount of available resources within the system exceeds a predetermined threshold amount, the reusable group of containers is deployed for the job; and
   running the containers in the reusable group of containers to implement the requested job.

2. The computer-implemented method of claim 1, wherein the available resources within the system include hardware processing resources and storage resources that are currently available.

3. The computer-implemented method of claim 1, wherein the system is placed in a first mode according to a first predetermined policy in response to determining that the current amount of available resources for the system does not exceed a predetermined threshold amount, wherein a non-reusable group of containers is deployed to implement the job in response to determining that the system is in the first mode.

4. The computer-implemented method of claim 1, wherein the system is placed in a second mode according to a second predetermined policy in response to determining that the current amount of available resources for the system exceeds a predetermined threshold amount, wherein the reusable group of containers is deployed to implement the requested job in response to determining that the system is in the second mode.

5. The computer-implemented method of claim 1, wherein the reusable group of containers includes a reusable pod.

6. The computer-implemented method of claim 5, comprising using the reusable pod to perform one or more actions according to the job.

7. The computer-implemented method of claim 1, wherein in response to determining that a ratio of an amount of resources needed by the job to the current amount of available resources within the system does not exceed a predetermined threshold amount, a non-reusable group of containers is deployed for the job.

8. The computer-implemented method of claim 7, wherein a scaler module is invoked to deploy the non-reusable group of containers to implement the job.

9. The computer-implemented method of claim 1, wherein a transformer module is invoked to deploy the reusable group of containers to implement the job.

10. The computer-implemented method of claim 9, comprising:
identifying a creation request for a second job within the system;
in response to determining that the reusable group of containers invoked by the transformer module cannot implement the second job, invoking an API server to create another group of containers to implement the second job; and
in response to determining that the reusable group of containers invoked by the transformer module can implement the second job, retrieving information for the reusable group of containers, and invoking an API to execute a command within the reusable group of containers, based on the information for the reusable group of containers.

11. The computer-implemented method of claim 1, comprising reusing the reusable group of containers to implement a second requested job.

12. A computer program product comprising one or more computer readable storage media, and program instructions collectively stored on the one or more computer readable storage media, the program instructions comprising instructions configured to cause one or more processors to perform a method comprising:
identifying, by the one or more processors, a job creation request within a system;
determining, by the one or more processors, a current amount of available resources within the system;
conditionally deploying, by the one or more processors, a reusable group of containers for the job, based on the current amount of available resources for the system,
wherein in response to determining that a ratio of an amount of resources needed by the job to the current amount of available resources within the system does not exceed a predetermined threshold amount, a non-reusable group of containers is deployed for the job; and
running the containers in the non-reusable group of containers to implement the requested job.

13. The computer program product of claim 12, wherein the available resources within the system include hardware processing resources and storage resources that are currently available.

14. The computer program product of claim 12, wherein the system is placed in a first mode according to a first predetermined policy in response to determining that the current amount of available resources for the system does not exceed a predetermined threshold amount, wherein the non-reusable group of containers is deployed to implement the job in response to determining that the system is in the first mode.

15. The computer program product of claim 12, wherein the system is placed in a second mode according to a second predetermined policy in response to determining that the current amount of available resources for the system exceeds a predetermined threshold amount, wherein the reusable group of containers is deployed to implement the requested job in response to determining that the system is in the second mode.

16. The computer program product of claim 12, wherein the reusable group of containers includes a reusable pod.

17. The computer program product of claim 12, wherein a scaler module is invoked to deploy the non-reusable group of containers to implement the job.

18. The computer program product of claim 12, wherein in response to determining that a ratio of an amount of resources needed by the job to the current amount of available resources within the system does exceeds a predetermined threshold amount, the reusable group of containers is deployed for the job.

19. The computer program product of claim 18, wherein a transformer module is invoked to deploy the reusable group of containers to implement the job.

20. A system, comprising:
a processor; and
logic integrated with the processor, executable by the processor, or integrated with and executable by the processor, the logic being configured to:
identify a job creation request within a system;
determine a current amount of available resources within the system;
conditionally deploy a reusable group of containers for the job, based on the current amount of available resources for the system,
wherein in response to determining that a ratio of an amount of resources needed by the job to the current amount of available resources within the system exceeds a predetermined threshold amount, the reusable group of containers is deployed for the job; and
running the containers in the reusable group of containers to implement the requested job.

* * * * *